United States Patent [19]

Winzer

[11] Patent Number: 4,589,724

[45] Date of Patent: May 20, 1986

[54] MULTIPLE BRANCHING LIGHT WAVE GUIDE ELEMENT

[75] Inventor: Gerhard Winzer, Munich, Fed. Rep. of Germany

[73] Assignee: Siemens Aktiengesellschaft, Berlin & Munich, Fed. Rep. of Germany

[21] Appl. No.: 231,011

[22] Filed: Feb. 3, 1981

[30] Foreign Application Priority Data

Mar. 3, 1980 [DE] Fed. Rep. of Germany ....... 3008106

[51] Int. Cl.⁴ ............................. G02B 6/26; G02B 6/42
[52] U.S. Cl. ................................ 350/96.15; 350/96.16
[58] Field of Search ............................ 350/96.15, 96.16

[56] References Cited

U.S. PATENT DOCUMENTS 4,130,345 12/1978 Doellner ......................... 350/96.15

OTHER PUBLICATIONS

"Improved Optical Tapping Elements for Graded-Index Optical Fibers", pp. 130–135, 1979.
K. Nosu et al, "Multireflection Optical Multi/Demultiplexer Using Interference Fibers", Electronic Letters, vol. 15, #14, 7/5/79, pp. 414–415.

Primary Examiner—William L. Sikes
Assistant Examiner—Robert E. Wise
Attorney, Agent, or Firm—Hill, Van Santen, Steadman & Simpson

[57] ABSTRACT

A multiple branching means for distributing light from light wave guides for a plurality of horizontally extending light wave guide channels and a plurality of transversely extending light wave channels coupled to said horizontally extending channels and wherein a mirror layer is formed on an angle $\phi \geq 45°$ at the junction point between the horizontal and vertically extending channels with light wave guides mounted in the channels and wherein the mirror layer is designed as an edge variable filter so that the wavelength of the filter is varied from one filter end perpendicular to the light wave guides in the guiding channels as a function of the distance X from said one end.

7 Claims, 19 Drawing Figures

MULTIPLE BRANCHING LIGHT WAVE GUIDE ELEMENT

BACKGROUND OF THE INVENTION

1. Field of the Invention

This invention relates in general to apparatus and method for a multiple branching light wave guide functioning according to the beam splitter principle wherein a number of aligned guiding channels are mounted parallel to each other in one plane in a body, which are divided by a mirror layer mounted at an inclined angle relative to this plurality of channels for coupling energy between the horizontal channels and other light wave channels which extend at right angles to the first light wave channels.

2. Description of the Prior Art

Light wave guide branching elements which operate according to the beam splitter principle are known in which a plurality of aligned guidance channels are mounted parallel to each other in one plane in a body and are separated by means of a single mirror layer which is mounted at an angle relative thereto and in which additional guidance channels extend from the mirror layer and substantially at right angles to the first guidance channels so as to form a simple branching element.

Such individual branching element is easy to manufacture since parts of the branching element can be processed in blocks during the various method steps such as, for example, by aligning the light wave guides with respect to each other and the cost for the individual branching elements can be reduced inversely proportional to the number of individual branching elements manufactured. The simultaneous manufacture of many identical individual branching elements can be accomplished by cutting blocks parallel to the planes of the light wave guides. The individual branching elements can be then interconnected to form multiplexers and demultiplexers as is required in communication or data transmission wherein the various channels are separated in wave length so that multiplex operation can occur with single fiber systems on the input side of the channel junction and on the output side for the channel separation. The mirror layers must be designed as edge variable filters having different spectral responses relative to the edge of the filter. For this purpose, first a number of blocks with different matching element multiples must be manufactured. Such multiplexer/demultiplexer is described for four channels in the publication entitled Siemens Forschungs und Entwicklungsberichte, Vol. 8, No. 3, Pages 130-135 (1979).

Such multiplexer/demultiplexers require (p−1) different edge filters for p-channels with the edge filters having to be individually vapor deposited per block as a respective dielectric multiple layer structure.

SUMMARY OF THE INVENTION

It is an object of the present invention to modify a multiple branching element such that the construction of the multiplexer/demultiplexers can be significantly simplified so as to obtain great flexibility in the design of the systems.

These objects are inventively achieved in that the mirror layer is designed as an edge variable filter whereby the wave length $\lambda_K$ of the filter varies as a function of distance from an end of the filter perpendicular to the guidance channels for the fiber wave guides.

The multiple branching element of the invention provides that only one common edge variable filter need be manufactured and vapor deposited on only one common separating plane for all of the individual branching elements. Thus, the number of required manufacturing steps is significantly reduced. Also, the multiple branching elements produced in this manner can be employed for numerous uses. Thus, the light wave guides can be advantageously connected into a selective tree structure and multiplexers or demultiplexers can then be formed which have low insertion losses. Also, cascades of spectrally selective light wave guide branching circuits can be designed which can be used as mixed structures, for example.

A particularly simple connection of the desired light wave guides of the multiplex branching elements results in a further development of the invention in that the respective multiple plugs with light wave guide ends are flanged to the three end faces of the body of the element where the light wave guides emerge and which end faces are smoothly polished. The light wave guide ends which extend from the three end surfaces can then be interconnected by using short light wave guide jumpers. These connections are very simple because they can be formed by means of splices of the respective light wave guide ends.

The branching elements can be simply and inexpensively manufactured and as the inventive multiple branching element, the homogeneous mirror layer used in the prior art is replaced in the invention with an edge variable filter which has characteristics that vary from one end as a function of distance. A particularly advantageous method for manufacturing said edge variable filter is to vapor deposit dielectric layers with a rotating vapor deposition mask which has an aperture angle that changes in the radial direction according to the required filter variation. Merely by changing the vapor deposition mask, different filter characteristics can be accomplished. The vapor deposition time and thus the thickness of the layer are accomplished by using different aperture angles for the mask.

The inventive multiple branching element of the invention comprises substantially the complete multiplexer which can be connected to the light wave guide ends with the optical transmitters forming the inputs to the light wave guide ends and with the single fiber of the system representing the output. The channel junction of the input side of the transmitters to the single light wave guide of the system is thus rendered possible.

The multiple branching element of the invention also can be used as a demultiplexer. For improving crosstalk attenuation, the outputs of the branching element are connected to light wave guide ends of a band pass variable filter plate. Photodiodes are connected to the plate and a multiple plug plate in which the light wave guides are arranged and clamped parallel to each other and abut each other between two glass plates can be used as the output body for a band pass variable filter plate. An end face of the plate with the light wave guides is ground smoothly and the band pass variable filter is then vapor deposited thereon. For the variable filter the position $\lambda_s$ of the transmission characteristics of the band pass filter vary as a function of the distance x (the distance from one end of the filter). The functional relationship $\lambda_s(x)$ can be varied to any desired function by using a suitably shaped vapor deposition mask. If greater spacing of the transmission maxima is desired, then spacing members can be provided between the light wave guides of the multiple plug plate. Also, it is possible to employ photolithographic techniques for the definition of the exact light wave guide position.

Individual photodiodes can be mounted on the band pass variable filter plate and can be used as detectors. In a further development of the invention, however, it is provided that the band pass variable filter plate is connected by means of an adhesive cement layer with a monolithically integrated photodiode line.

It must be assured that the spacing between neighboring transmission maximums is equal to the spacing of neighboring photodiodes. Also, the individual detector windows should be selected to be large enough so that the coupling light wave guide/photodiode arrangements have minimum insertion loss and also they should be selected to be small enough so that the highest possible data rates can be transmitted and received which means that the diode capacitance should be small.

The space between the detector areas should be selected to be large enough such that the channel separation achieved with the band pass filter is not destroyed by cross-talk.

The multiple branching element of the invention for multiplexers/demultiplexers when employed in tree structures results in modules with $2^m$ channels. The number of channels is only limited by the insertion losses which increase with m and by the filter characteristic in relation to the emission half bandwidth of the transmitter diodes. For example, the insertion losses can be reduced by means of thick core light wave guides with a high numerical aperture in the multiple branching element of the demultiplexer. When employing only a single common separating plane of differing filter properties, other connections in addition to the light wave guide connections to form tree structures can be easily realized with the branching element of the invention. Simple cascading of spectrally selective fiber branches can be designed as well as mixed structures. The coupling of the separate elements of the multiple branching element to the edge variable filter plate with the photodiode line are respectively to the individual photodiodes, the transmission diode lines or the individual transmission diodes by way of optional splice connections between the fiber ends of the multiple plug plate allow a great flexibility in the design of the system. Thus, for example, by incorporating light wave guide change-overs, a unidirectional multichannel system can be changed over, as needed, into a bidirectional system.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
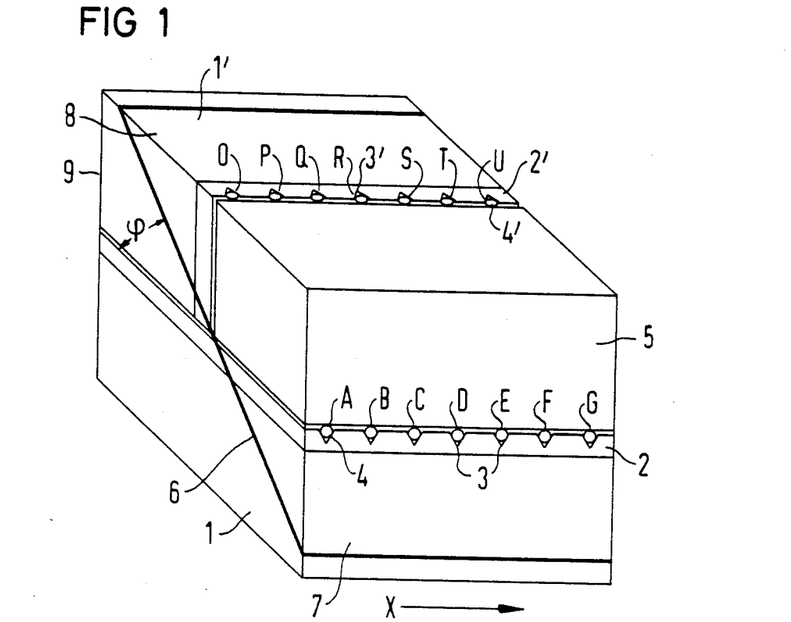
FIG. 1 is a perspective view of a multiple branching element in which seven fiber wave guides are arranged.

FIG. 1 illustrates in perspective view a multiple branching element which is formed as a cuboid block. The block comprises a lower substrate 1 upon which is mounted a first silicon layer 2 which is formed with seven guidance channels 3 in which light wave guides 4 designated A, B through G are mounted. A second substrate 1' has an end silicon layer 2' which is transverse to the silicon layer 2 and the silicon layer 2' is formed with a plurality of channels in which a plurality of light wave guides 3' are mounted. The light wave guides 3' are designated O through U. A cover member 5 generally cuboid shape has faces which cover the wave guides 3 and 3' and the various parts can be joined together as, for example, by a suitable cement. The substrates 1, 1' and cover member 5 may be formed of glass, for example. The longitudinal axes of the light wave guides 4' in the sample embodiment extend perpendicular to the axes of the light wave guides 4. However, the angle between the wave guides can be inclined relative to each other by an angle smaller than 90° if desired.

The substrates 1 and 1' are cut on a plane and an edge variable filter 6 is vapor deposited on one of the surfaces after which the substrates are reconnected together by gluing as, for example, with cement. The angle $\phi$ may be 45° or larger than 45° and the edge variable filter which is vapor deposited on the plane through the light wave guides has a filter characteristic such that the wave length $\lambda_K$ varies as a function of the distance x from one end of the filter. In other words, the filter on the surface 6 is such that the wave guide O which extends vertically relative to FIG. 1 and adjoins the wave guide A will pass through the edge variable filter 6 such that the wave length $\lambda_{K1AO}$ will be different from the wave length $\lambda_{K1BP}$ of the adjacent wave guides P-B and progressively through the filter such that the wave length and pass band of the filter varies as a function of distance from the end of the filter adjacent the wave guides O and A.

In the illustrated embodiment, the end face surfaces 7, 8 and 9 from which the light wave guides 4 and 4' emerge are polished smoothly. The light wave guides in the surface 7 are indicated as wave guides A through G. The light wave guides emerging from the surface 8 are indicated as O through U and the light wave guides emerging from the surface 9 are not shown but in other Figures are referenced as H through N.

In order to manufacture a multiple branching element such as illustrated in FIG. 1, the following manufacturing steps may be utilized. First, a number of parallel guidance channels are formed in a planar surface of a silicon layer such as the layer 2. Then the channeled silicon layer 2 is bonded to a substrate such as the substrate 1 as, for example, with suitable cement. Then a second silicon layer 2' is formed with channels and the layer 2' is bonded to the end surface of a second body member 1'. Light wave guides 4 are mounted in the channels formed in the silicon layer 2 and light wave guides 4' are inserted into the guide channels 3' of the member 1'. Then the member 1' is attached to the body member 1 with suitable cement and a cover member 5 is attached to the member 1 and member 1' using an optical adhesive.

The surfaces of the silicon layers are polished optically smooth before the members 1, 1' and 5 are joined and the members are adjoined such that the axes of the light wave guides 4 and 4' abut orthogonally or at an angle smaller than 90° so that light can be coupled between the wave guides as desired. Then the parts are glued in the assembled position. The block which has been formed in this manner is then cut on a plane along the bisecting line defined by the light wave guides 4 and 4' as illustrated in FIG. 1. The surfaces of the planes thus formed are polished optically smooth and then upon one of them is formed an edge variable filter 6. The edge variable filter 6 has transmission characteristics which vary as a function of the distance x from the end of the filter as described above. Then the two halves are joined together such that the edge filter 6 lies between them and such that the axes of the corresponding light wave guides 4 and 4' are aligned. The block thus manufactured forms the essential module for a multiplexer or demultiplexer.

Figure 2:
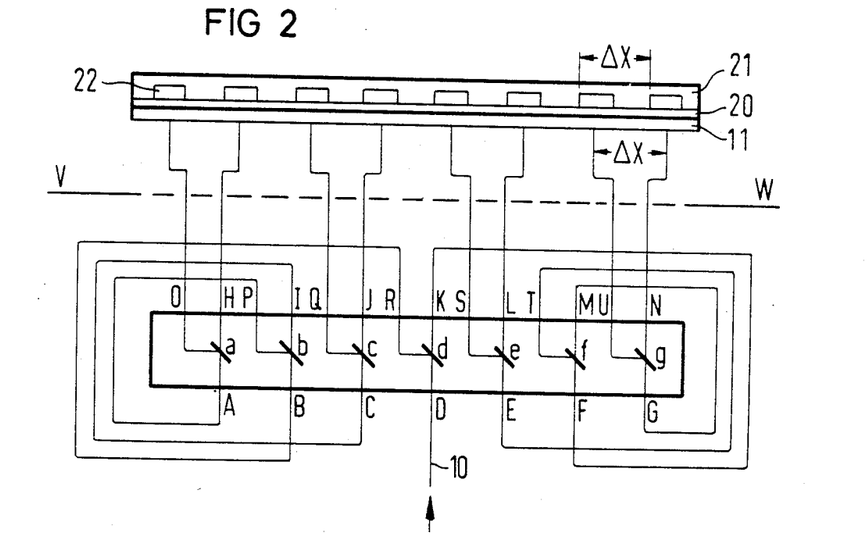
FIG. 2 is a schematic illustration of a demultiplexer with eight channels constructed from the branching element illustrated in FIG. 1.

FIG. 2 illustrates schematically a demultiplexer having eight channels and illustrates all of the wave guide connections which are required between the various components. The wave guides A through G are illustrated at the bottom of FIG. 2 and correspond to the light wave guides A through G illustrated in FIG. 1. The light wave guides O through U which are respectively coupled to the wave guides A through G are illustrated as emerging at right angles to the beam splitters a through g and the wave guides H through N which emerge from the surface 9 in FIG. 1 and which cannot be seen are illustrated in FIG. 2. For the demultiplexer, the fiber optical wave guide A through G represent the inputs, the fiber optical wave guides H through N represent outputs in transmission and the fiber optical wave guides O through U represent outputs in reflection.

The connections of the light wave guides such as A-P, B-R, C-I, E-T, F-K and G-M can be made by using short light wave guides lengths. Advantageously, however, multiplex with light wave guide ends were flanged to the three smoothly polished surfaces 7, 8 and 9 of the block illustrated in FIG. 1. The connections can then be made by splicing the short light wave guide ends. The portion of the circuit illustrated in FIG. 2 from the bottom up to the broken line V-W illustrates the complete structure of a muliplexer. The unit can be formed as a demultiplexer by adding components which have not been described but which are illustrated above the line V-W. The light wave guide 10 extending from wave guide D forms the input to the demultiplexer or alternatively the output from the multiplexer 10 can be connected to an external coupling. In a multiplexer, the light wave guide ends O, H, Q, J, S, L, U, N are directly connected to optical transmitters as, for example, laser diodes or alternatively luminescent diodes which emit light at different wave lengths.

In the case of a demultiplexer, the outputs are spliced to light wave guide ends of a band pass variable filter plate 11.

Figure 7:
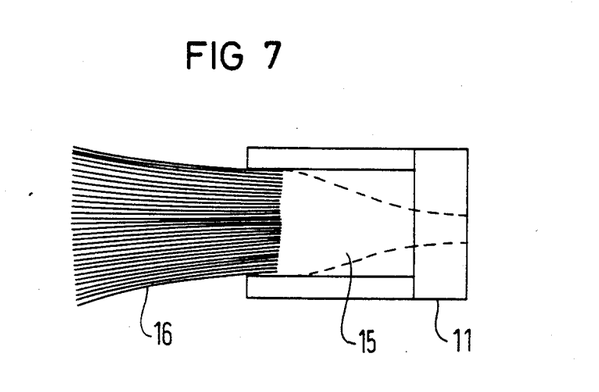
FIG. 7 is a top plan view of a multiple plug plate with fiber ends.
Figure 8:
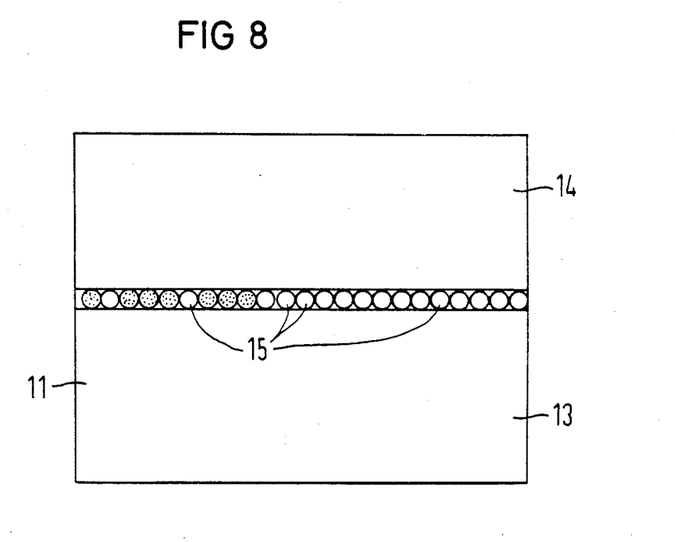
FIG. 8 is the end face of the plate illustrated in FIG. 7 in the tapered area.

FIGS. 7 and 8 comprise two different view of a band pass variable filter plate 11. The external shape of the plate 11 corresponds to known multiple plugs and between a substrate 13 and a cover 14, bare light wave guides 15 are glued next to each other abutting in one plane in a tapering area as shown in FIG. 8. The end faces are polished and a band pass variable filter is vapor deposited on this plane. In this variable filter, the position $\lambda_s$ of the peak transmission of the band pass wave length varies as a function of the distance x. The functional interrelationship between the $\lambda_s$ and x can be determined by using a suitable vapor deposition mask which has a suitable shape.

FIG. 7 illustrates the band pass variable filter 11 in plan view with the light wave guides 15 opening up toward the back and becoming further apart and with the light wave guide ends 16 insulated from each other with synthetic material. If greater spacing of the individual light wave guides is desired, then for example, spacing members can be provided instead of merely omitting light wave guides as illustrated in FIG. 8. When a silicon layer with light wave guide channels is used, spacing members are not required.

The band pass variable filter plate 11 illustrated in FIGS. 7 and 8 is connected as shown in FIG. 2 to a monolithically integrated photodiode line 21 by means of an adhesive layer 20. The modular dimension $\Delta_x$ of the diode line 21 and the variable filter plate must be identical. The individual diode windows 22 are selected to be large enough such that the coupling light wave guide/photodiode has minimum insertion losses but, however, is at the same time selected to be small enough such that the response time of the photodiodes remain short and the intended high data rate can be obtained. The intermediate space which separates the detector areas 22 from each other is selected to be large enough such that the channel separation achieved with the band pass separation is not degradated due to cross-talk.

Individual diodes can be employed instead of an integrated photodiode line 21 if desired.

Figure 3A:
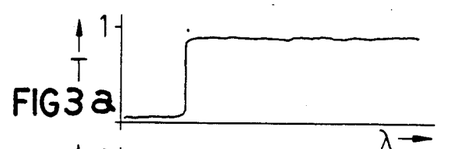
FIGS. 3a, 3b, 3c, 3d, 3e, 3f, and 3g illustrate the variation of transmission as a function of wave length in the edge variable filter in the seven individual branching elements illustrated in FIG. 1.
Figure 3B:
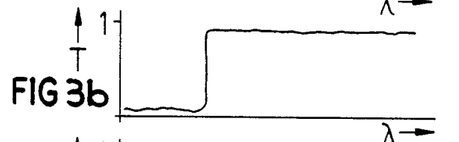
Figure 3C:
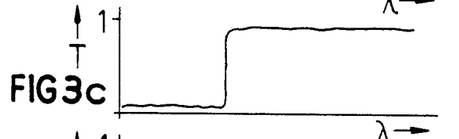
Figure 3D:
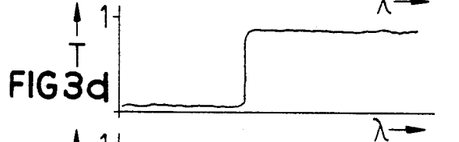
Figure 3E:
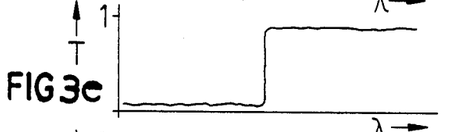
Figure 3F:
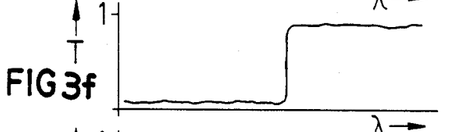
Figure 3G:
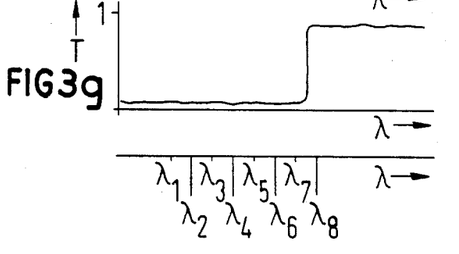
Figure 3H:
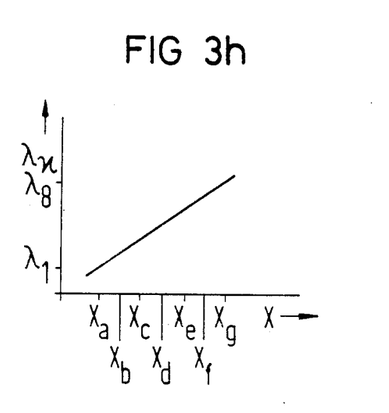
FIG. 3h is a plot of the center pass wave length of the filter at different distances from the filter edge.

The spectral transmission curves of the edge variable filter 6 according to FIG. 1 which is inclined at an angle $\phi$ relative to the light wave guide members 3 are illustrated in FIGS. 3a through 3g for the location a through g of the individual branching elements illustrated in FIG. 2. As can be seen, from Figures a through g, the wave length at the various branching elements shifts to longer and longer wave lengths at each location as a function of the distance x from the end of the filter. As can be clearly observed in FIG. 3h, a linear relationship exists between the wave length of the filter edges $\lambda_K$ and the distance x. It is possible, however, for a relationship other than a linear relationship can be selected when the spectral spacing of the channels is not equidistant. The wave length for the individual filter at the points corresponding to the locations a through g of the individual branching elements are illustrated in FIG. 3h.

Figure 4A:
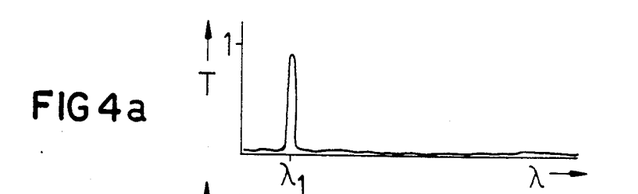
FIGS. 4a and 4b are plots of the transmission characteristics of two channels of the band pass variable filter illustrated in FIG. 2.
Figures 4B, 4C:
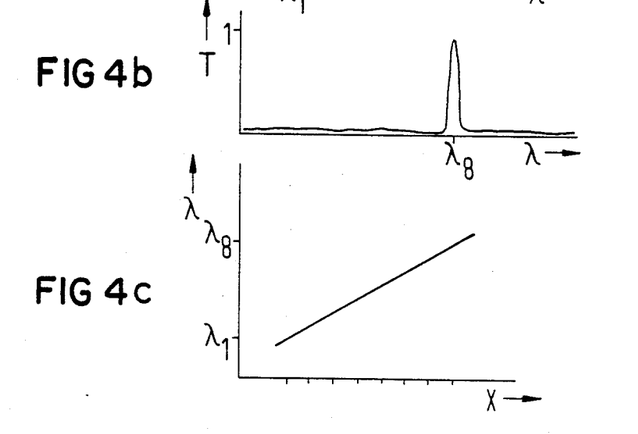
FIG. 4c is a plot of the center wave length of the filter as a function of the distance x.

FIGS. 4a and 4b illustrate plots of the band pass variable filter for two separate locations. For example, FIG. 4a illustrates the transmission characteristics at a particular location for the wave length $\lambda_1$ which has a relatively small x which means its near to one end location of the filter and FIG. 4b illustrates a large transmission characteristic for the wave length $\lambda_8$ which has a relatively large distance x from the same end of the filter.

FIG. 4c illustrates the linear relationship between the maximum transmission wave length of the band pass variable filter and its distance x from one end of the filter.

Figure 5:
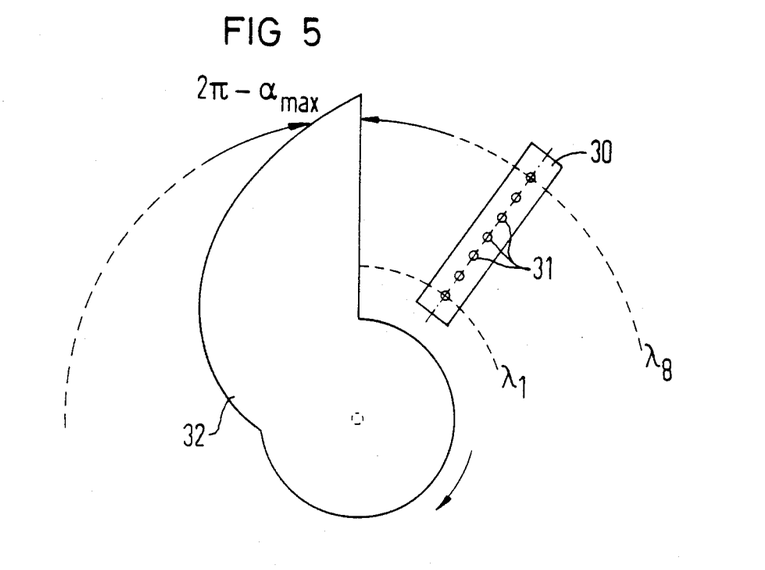
FIG. 5 is a plan view of a rotating vapor deposition mask for manufacturing the filter.

FIG. 5 illustrates one method of manufacturing a variable filter consisting of dielectric layers. The surface with the light wave guide end surfaces 31 which is to be vapor deposited is schematically illustrated in FIG. 5. It is to be realized that vapor deposition of different thicknesses is to be applied to the ends 31 so as to obtain the edge variation filter as described above. For this purpose, a rotating vapor deposition mask 32 is mounted on a suitable axis and rotated so that it at certain times shields the ends 31 and the surface 30 from an evaporation source not illustrated which is mounted above the mask. The angle of aperture $\alpha$ of the vapor deposition mask 32 changes as a function of the radius and could be, for example, according to the linear interrelationships of $\alpha = m.r. - h$. Due to the time of vapor-deposition which is varied according to the rotation of the mask 32, the thickness s of a vapor deposited layer will vary linearly with radius. Another way of explaining this is that the amount of deposition of the vapor deposited layer depends upon the time of deposit and also is decreased by the amount of time that the mask is over a particular portion of the surface 30 and thus the thickness of the layer between the points indicated by $\lambda_1$ and $\lambda_8$ will receive different thicknesses of the vapor deposited layer.

Figure 6:
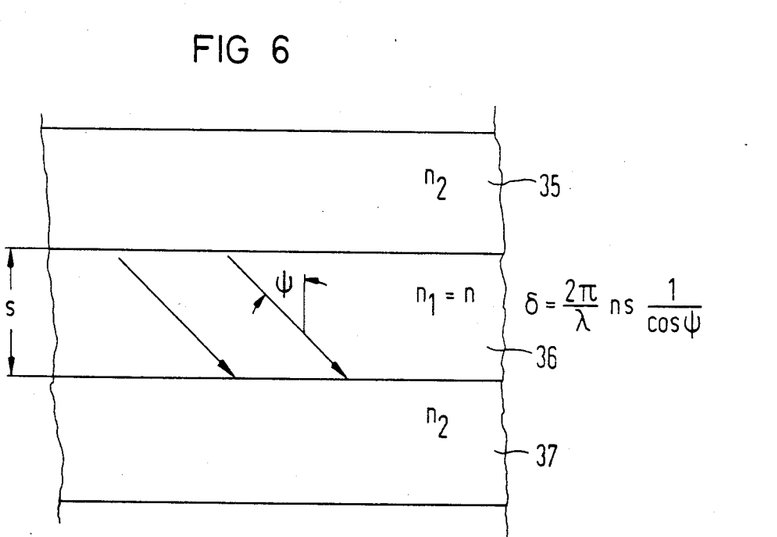
FIG. 6 is a sectional view of a multilayer filter.

Phase shifts $\delta$ are fixed as parameters for dielectric filters formed as multiple layer systems. Frequently, it is a matter of $\lambda/4$ layers with $\delta = \pi/2$ or of $3\lambda/4$ layers. FIG. 6 shows a section of a multiple layer filter having three layers 35, 36 and 37 with the two outer layers 35 and 37 having the same index of refraction $n_2$ and the center layer 36 having an index of refraction $n_1 = n$. If the direction of propagation of the instant light is inclined by the angle $\psi$ with respect to the layer 36, the same filter behavior will result with various wave lengths when the same phase shifts are generated. The phase shift in the layer 36 having a thickness s in case of $\lambda/4$ layers is:

$$\delta = \frac{2\pi}{\lambda} \cdot n \cdot s \cdot \frac{1}{\cos \psi}.$$

Therefore, the same filter characteristic for two wave lengths $\lambda_1$ and $\lambda_2$ presumes that the angles of apertures $\alpha_1$ and $\alpha_2$ change according to the wave lengths:

$$\lambda_1 : \lambda_2 = \alpha_1 : \alpha_2.$$

The shape of the mask can be determined from the simple relationship as will be illustrated from the following example. If the desired spectral range extends from $\lambda_{minimum} = 720$ nm through $\lambda_{maximum} = 950$ nm, and the desired filter lengths with a linear function with respect to wave length is $l = 30$ mm. If the position of the outermost channel with respect to the radial spacing of the vapor deposition mask 32 has a $r_{max} = 60$ nm, the angle $\alpha_{max} = 350°$ is not to be exceeded and is to be achieved at $r_{max}$. Thus, from the equation $$\alpha = \alpha_{max} \cdot \frac{\lambda}{\lambda_{max}},$$

and $\alpha_{min} = 265°$. If $\Delta\alpha = \alpha_{max} - \alpha_{min}$, then:

$$\alpha = \frac{\Delta\alpha}{l} \cdot (r - r_{max}) + \alpha_{max}.$$

Figure 9:
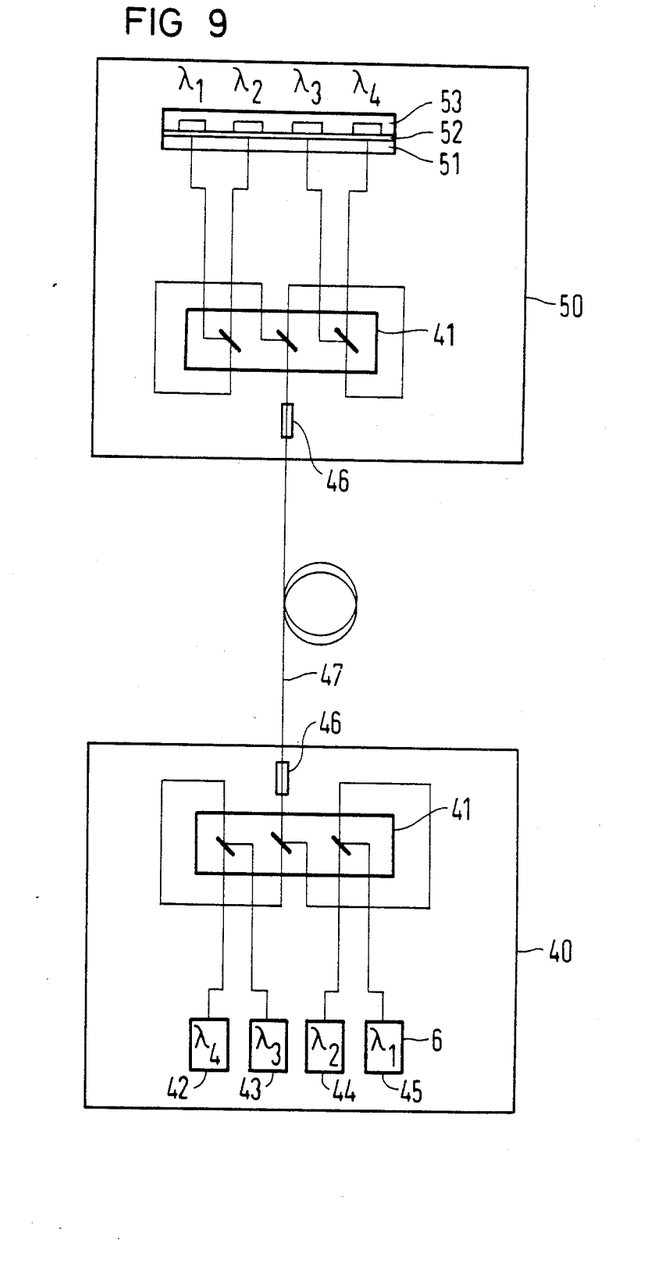
FIG. 9 illustrates a transmission system utilizing a multiplexer and demultiplexer.

FIG. 9 illustrates a complete transmission system for four wave lengths $\lambda_1$ through $\lambda_4$. The lower portion of FIG. 9 illustrates a multiplexer 40 comprising the multiple branching element 41 of the invention and in addition four transmitters 42 through 45 which are tuned to the wave lengths $\lambda_1$ through $\lambda_4$ respectively. A coupling 46 is connected between the multiplexer output and an single fiber light wave guide transmission line 47. In the upper portion of FIG. 9, is schematically illustrated a demultiplexer 50 which contains the multiple branching element 41 of the invention with the same connections as the multiplexer 40 except that the inputs and outputs are interchanged. Also, the demultiplexer 50 according to the sample embodiment illustrated in FIG. 2 contains a band pass variable filter plate 51 which is connected by means of an adhesive layer 52 to a photo line 53. FIG. 9 illustrates a multi-channel unidirectional transmission system wherein the information would be transmitted from the unit 40 to the unit 50.

Figure 10:
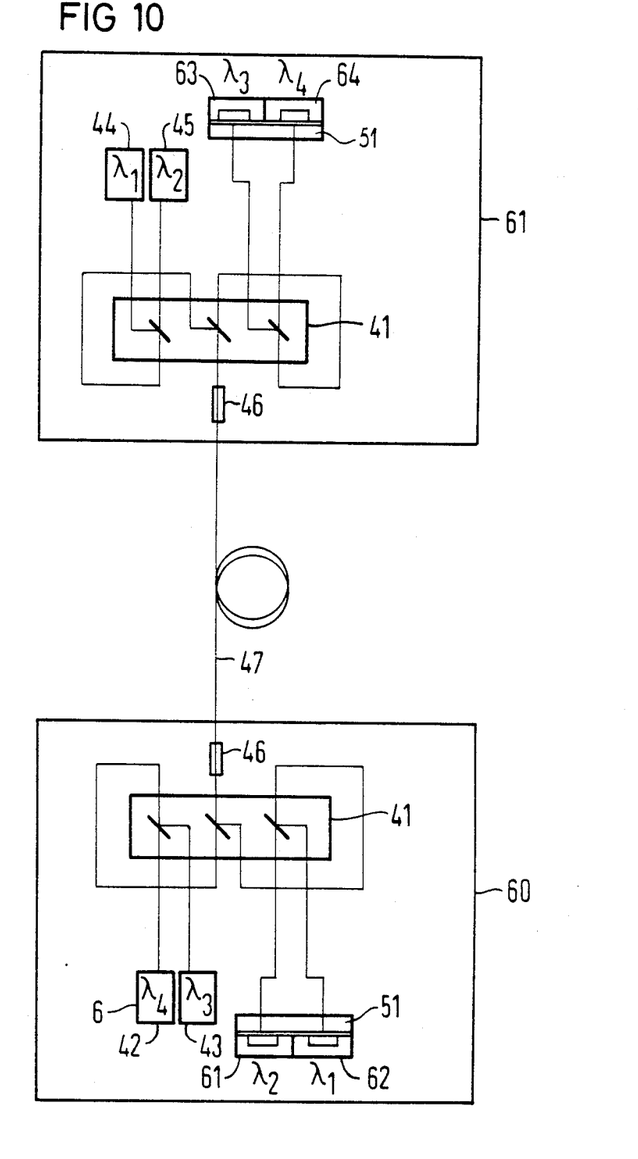
FIG. 10 illustrates a transmission system which is bidirectional.

FIG. 10 illustrates a bidirectional transmission system having two respective parallel channels. The system of FIG. 10 consists of two mixed multiplexer/demultiplexer units 60 and 61 and an interconnecting single fiber light wave guide transmission wave guide 47. Those parts which are identical to those illustrated in FIG. 9 have the same reference symbols. In the embodiment of FIG. 10, in the unit 60, for example, there are a pair of transmitting diodes 42 and 43 connected as shown and in the unit 61 there are a pair of transmitting diodes 44 and 45 connected as shown. The diodes 42 and 43 are respectively connected to multiple branching elements 41 in each of the units 60 and 61 as shown. A pair of photosensitive detectors 61 and 62 are mounted in unit 60 and are connected by way of the band pass graduated filter plate 51 and an adhesive layer to the multiple branching element 41 of the unit 60. The photosensitive detectors 63 and 64 in unit 61 are coupled by band pass variable filter and an adhesive layer to the multiple branching element 41 in unit 61. The system of FIG. 10 allows two channel messages to be simultaneously transmitted and received in both directions.

Although the invention has been described with respect to preferred embodiments, it is not to be so limited as changes and modifications can be made which are within the full intended scope as defined by the appended claims.

I claim as my invention:

1. A multiple branching element for distributing light from at least one feeding light wave guide to continuing light wave guides according to the beam splitting principle in which a plurality of first and second aligned guidance channels are disposed parallel to one another in one plane in a body, said guidance channels being separated by means of a single reflective layer inclined with respect thereto and a plurality of further third guidance channels with one for each of said first and second guidance channels extending from the mirror layer and one of said aligned first and second guidance channels, a plurality of light wave guides mounted in said first, second and third plurality of channels characterized in that said reflective layer is formed as an edge variable filter (6), whereby the wavelength $\lambda_K$ of the filter varies continuously as a function of the distance (x) from the end of the filter perpendicular to the first, second and third plurality of guidance channels.

2. A multiple branching element according to claim 1, characterized in that the light wave guides (4, 4') are connected to form a selective tree structure.

3. A multiple branching element according to claim 1, characterized in that respective multiple plugs (11) with light wave guide ends (16) are flanged to the end faces (7 through 9) of said body at which light wave guides (4, 4') emerge and which are smoothly polished.

4. A multiplex branching element according to claim 3, characterized in that optical connections between the light wave guides (4, 4') are made by splicing the respective light wave guide ends (16).

5. A multiple branching element according to claim 4 wherein said element serves as a multiplexer, wherein the said light wave guide ends forming inputs are connected to a plurality of optical transmitters (42 through 45) and the light wave guide ends carrying the outputs are connected to a simple fiber light wave guide (47).

6. A multiple branching element according to claim 4 wherein said element serves as a demultiplexer, wherein the outputs of the multiple branching element are spliced to light wave guide ends of a band pass variable filter plate (51) and a plurality of photodiodes connected to said band pass variable filter plate (51).

7. A multiple branching element according to claim 6, characterized in that said band pass variable filter plate is connected by means of an adhesive layer (20, 52) to a monolithically integrated photodiode line (21, 53).

* * * * *